(12) United States Patent
Spaulding et al.

(10) Patent No.: US 7,234,888 B2
(45) Date of Patent: Jun. 26, 2007

(54) ARRANGEMENTS FOR ANCHORING ITEMS TO AUTOMOTIVE FRAMING COMPONENTS

(75) Inventors: James R. Spaulding, Macomb, MI (US); Todd E. Durocher, Warren, MI (US); Bernard W. Stone, Detroit, MI (US); Michael J. Kelley, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 102 days.

(21) Appl. No.: 10/827,753

(22) Filed: Apr. 20, 2004

(65) Prior Publication Data

US 2005/0232692 A1    Oct. 20, 2005

(51) Int. Cl.
*B25G 3/36* (2006.01)

(52) U.S. Cl. ............ 403/388; 403/299; 411/389; 24/297; 16/412

(58) Field of Classification Search ........... 403/708.1, 403/299, 388; 411/389, 411, 413, 554; 24/458, 24/457, 701, 297; 16/444, 412, 431–432, 16/436
See application file for complete search history.

(56) References Cited

U.S. PATENT DOCUMENTS

| | | | | |
|---|---|---|---|---|
| 2,096,387 A * | 10/1937 | Tinnerman | ............ | 72/331 |
| 3,541,918 A * | 11/1970 | Johnson | ............ | 411/412 |
| 3,897,713 A * | 8/1975 | Gugle | ............ | 411/389 |
| 4,310,272 A * | 1/1982 | Rich et al. | ............ | 411/185 |
| 5,259,089 A * | 11/1993 | Baur et al. | ............ | 16/444 |
| 5,451,225 A * | 9/1995 | Ross et al. | ............ | 606/59 |
| 5,632,061 A * | 5/1997 | Smith et al. | ............ | 16/444 |
| 5,746,039 A * | 5/1998 | Nystrom | ............ | 52/639 |
| 6,241,294 B1 * | 6/2001 | Young et al. | ............ | 292/336.3 |
| 6,415,478 B1 * | 7/2002 | Watanabe et al. | ............ | 16/444 |
| 6,477,050 B1 * | 11/2002 | Herring et al. | ............ | 361/704 |
| 6,517,302 B2 * | 2/2003 | Lee | ............ | 411/182 |
| 6,668,424 B1 * | 12/2003 | Allen et al. | ............ | 16/444 |
| 6,804,864 B2 * | 10/2004 | Kirchen et al. | ............ | 24/297 |
| 6,895,635 B2 * | 5/2005 | Tisol et al. | ............ | 16/110.1 |
| 6,969,100 B2 * | 11/2005 | Totani et al. | ............ | 296/1.02 |

* cited by examiner

*Primary Examiner*—Daniel P. Stodola
*Assistant Examiner*—Nahid Amiri
(74) *Attorney, Agent, or Firm*—Laura C. Hargitt

(57) ABSTRACT

An item such as a passenger assist handle is anchored to an automotive framing component by a mounting stud passing through a hole in the framing component. The mounting stud includes a shaft with a helix at a first end and a threaded portion at a second end. The helix and threaded portion are of opposite hands and the threaded portion receives a stop nut thereon. The automotive framing component has a teardrop shaped opening therethrough having a first diameter substantially equal to the diameter of the shaft and a second diameter substantially equal to the radius of the helix. Upon threading the nut onto the shaft, while the stud is held initially stationary by frictional engagement between its surface and surfaces of the framing component adjacent to the teardrop shaped opening, the stop nut bottoms against a shoulder on the shaft and then begins rotating the shaft to drive the helix through the teardrop shaped opening. The stop nut then engages the base portion and urges the base portion of the item into a tight relationship with the faming component. Preferably, the mounting stud is made of an acetal homopolymer.

18 Claims, 4 Drawing Sheets

ARRANGEMENTS FOR ANCHORING ITEMS TO AUTOMOTIVE FRAMING COMPONENTS

FIELD OF THE INVENTION

The present invention is related to arrangements for anchoring items to automotive framing components. More particularly, the present invention is directed to arrangements for anchoring items to automotive framing components wherein the items include, but are not limited to, passenger assist handles, coat hooks, lighting fixtures, sun visors and any other item which is mounted on automotive framing components

BACKGROUND OF THE INVENTION

Currently two arrangements are used to anchor passenger assist handles to framing components of vehicles passenger compartments. In one arrangement a handle is retained by a push-in clip that is inserted through a hole previously punched in the framing component. The clip has a barbed point that expands once forced through the hole in the framing component.

In accordance with the second method, a threaded fastener and retaining nut are used. The nut often referred to as a J-clip or J-nut is aligned with a punched hole in the framing component and the threaded fastener is driven through both the handle and the nut. J-clips are relatively expensive and the labor costs related to inserting the nut are relatively high. Moreover, eliminating parts such as J-clips eases assembly.

In the passenger compartments of automotive vehicles there are numerous items such as coat hooks, visors, mirrors, light fixtures and other items which require attachment to framing components. There are also exterior items, such as but not limited to, roof racks, spoilers and mirrors. Reductions in cost, while maintaining or improving reliability, is a constant goal as anchors and attachment devices evolve.

SUMMARY OF THE INVENTION

An arrangement for anchoring items to automotive framing components and/or sheet metal comprises a base portion of the item having a hole therethrough and a mounting stud extending through the hole in the base portion for coupling with an opening in the framing component. The mounting stud has a shaft of a selected diameter, which shaft has first and second end portions. The first end portion of the shaft has a helix therearound, the helix having a diameter larger than the hole in the base portion of the item. The second end portion on the shaft has a stop element thereon also with a diameter larger than the hole in the base portion. The second end portion of the shaft is constructed and arranged to cooperate with a rotating tool for advancing the helix into the opening in the framing component. The opening through the framing component has a first diameter sufficient to permit passage of the shaft therethrough and a second diameter equal to the diameter of the shaft plus the width of the helix. An item, such as but not limited to a handle, a coat hook, a lighting fixture, a sunshade or any other item, becomes positively fixed with respect to the framing component upon rotating the mounting stud to drive the helix through the opening in the framing component until the base achieves a tight relationship with respect to the framing component.

In a further aspect of the invention, the second end portion of the shaft is threaded and the stop is a nut threaded on the second end portion.

In still a further aspect of the invention, the second end of the shaft is threaded in oppositely of the helix so that when the nut is rotated by the rotating tool, the nut tightens against a first side of the base and the base thereafter tightens with respect to the framing component or sheet metal.

In still a further aspect of the invention at least the helix on the stud is made of plastic.

In still a further aspect of the invention the entire mounting stud is made of an acetal homopolymer.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
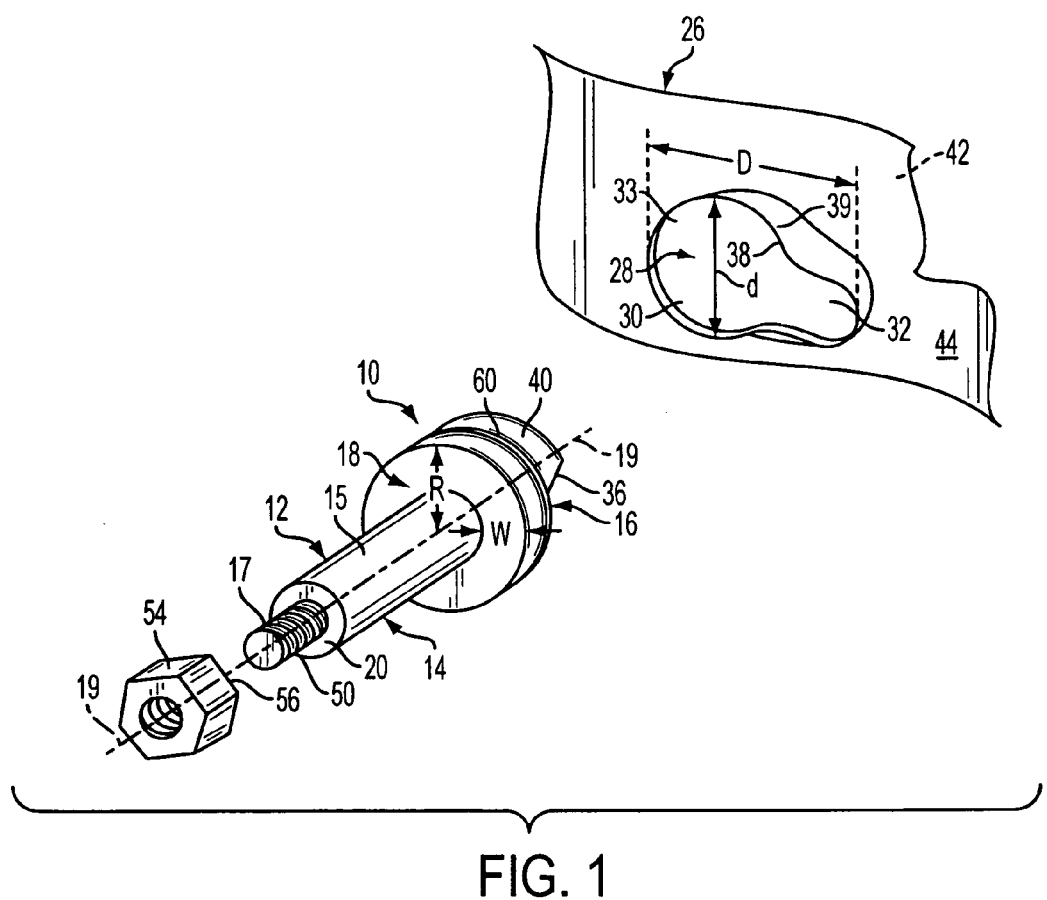
FIG. 1 is an exploded perspective view of components comprising an anchoring arrangement according to the present invention.

Referring now to FIG. 1 there is shown an anchoring arrangement 10, configured in accordance with the present invention, wherein a mounting stud 12 is comprised of a shaft 14 having a smooth intermediate portion 15, a first end portion 16 and a second end portion 17. The first end portion 16 is configured as a helix 18 having a selected width W as measured from the surface of the intermediate portion 15 of the shaft 14, and a radius R as measured from the axis 19 of the shaft 14. The first end portion 16 advances when rotated in the clockwise direction. The second end portion 17 is threaded with a thread that advances the opposite direction of the helix 18. A shoulder 20 is positioned between the second end portion 17 and the intermediate smooth cylindrical portion 15.

In order to attach the mounting stud 12 to a plate 26, the plate 26 has a teardrop shaped hole 28 therethrough which has a first portion of a diameter "d" which is large enough allow the intermediate portion 15 of the shaft 14 to pass therethrough. The teardrop shaped hole 28 also has a second portion 32 which when added to the first portion 30 has an increased diameter "D" which substantially equals the diameter of the shaft 14 plus the width "W" of the helix 18, the width being measured radially from the surface of the intermediate portion 15 to the edge of the helix. This distance is also the radius "R" of the helix 18. Consequently, when the leading edge 36 of the helix 18 aligns in front of a raised edge 38 of the teardrop shaped hole 28 at the beginning of a curving ramp portion 39 of the plate 26, a back surface 40 of the helix slides behind a back surface 42 of the plate 26. As the helix 17 is rotated in the clockwise direction, it advances through the teardrop shaped hole 28, pulling the second end portion 17 of the shaft 14 toward a front face 44 of the plate 26.

In order to rotate the mounting stud 12, the second end 17 of the mounting stud has a thread 50 thereon which preferably advances in a direction opposite the direction of advance of the helix 18. The shaft 14 of the mounting stud 12 is initially frictionally restrained from rotation as a stop nut 54, which has an internal thread 56 matching the thread 50, is rotated in the clockwise direction thereon. As the stop nut 54 is rotated, it advances toward the shoulder 20. The initial frictional restraint of the shaft 14 is due to relatively high friction between the outer surface 44 of the plate 26 and a front face 60 of the helix 18 and also is due to slight distortion of the helix which occurs as the helix advances through the teardrop shaped hole 28. This initial resistance is sufficient to keep the shaft 14 stationary until the back surface 56 of the stop nut 54 bottoms against the shoulder 20, at which time the shaft 14 begins to rotate clockwise so as to drive the helix 18 through the teardrop shaped hole 28. The mounting stud 12 is then firmly seated in the teardrop shaped hole 28 of the plate 26 for anchoring various items to the plate.

Figure 2:
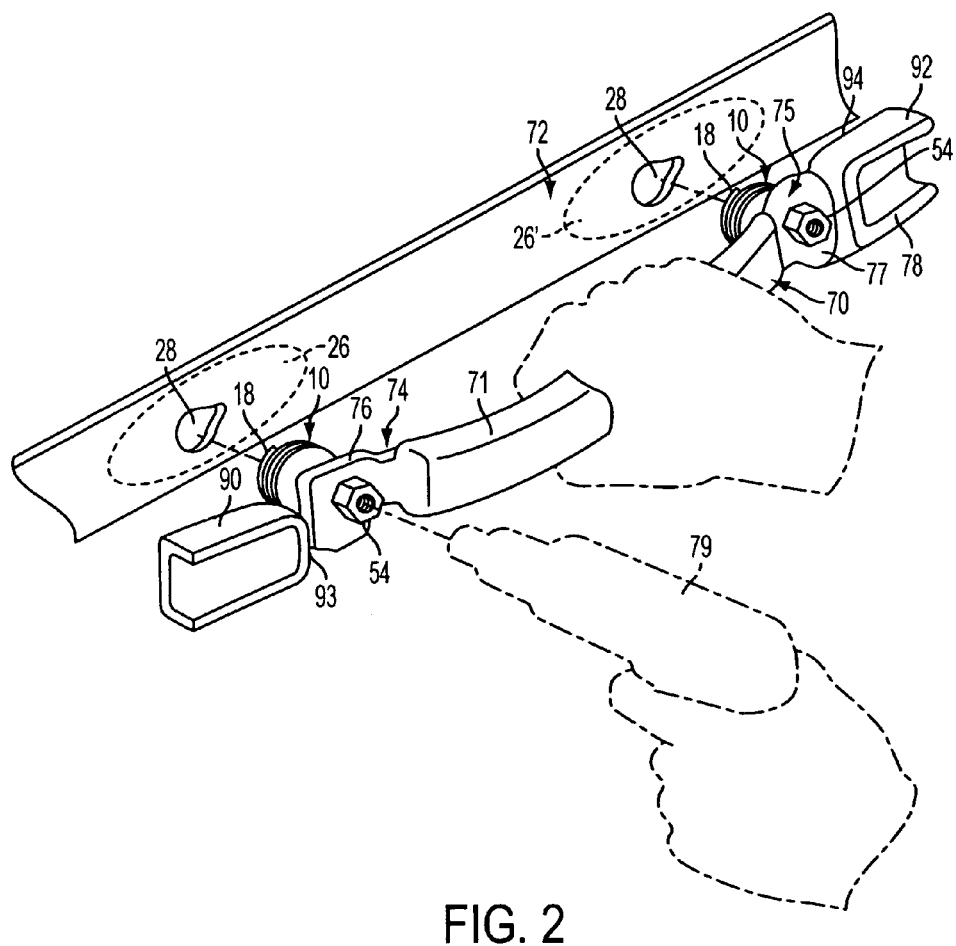
FIG. 2 is an exploded perspective view of a passenger assist handle based anchored to a roof rail using the anchoring arrangement of FIG. 1.
Figure 3:
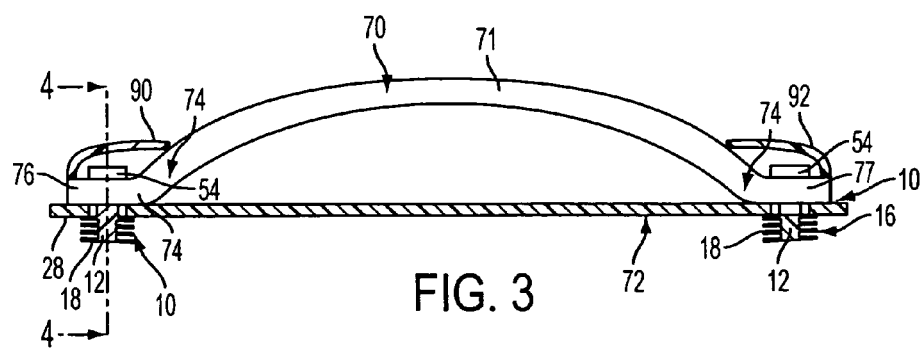
FIG. 3 is a top view of a passenger assist handle of FIG. 2, partially in elevation, installed on the roof rail.
Figure 4:
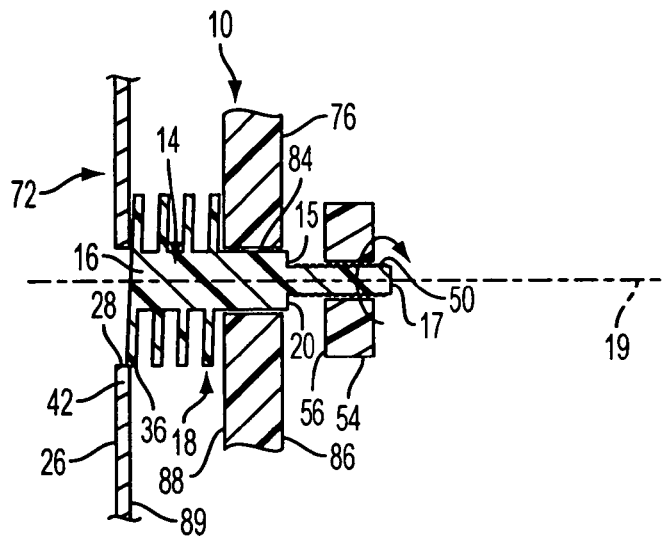
FIG. 4 is an elevation taken along lines 4—4 of FIG. 3 showing a portion of the handle of FIG. 3 and the anchoring assembly with a mounting stud having a stop nut loosely threaded thereon.

Referring now to FIGS. 2–6 there is shown an example of an item which is retained by the anchoring arrangement 10 of FIG. 1. In FIGS. 2–4, the item is a passenger assist handle 70 having a grip portion 71, which passenger assist handle is mounted to a roof rail 72. The roof rail 72 is a framing component defining a passenger compartment (not shown) of an automotive vehicle. The handle 70 has first and second ends 74 and 75 which have base portions 76 and 77 which are attached by helixes 18 of mounting studs 12 to the roof rail 72 via the teardrop shaped openings 28.

Figure 5:
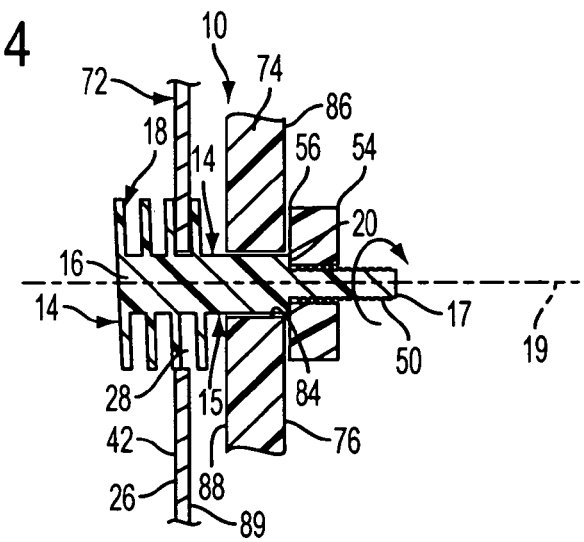
FIG. 5 is a view similar to FIG. 4 showing the stop nut tightened on the mounting stud and the mounting stud advancing into an opening in the roof rail.
Figure 6:
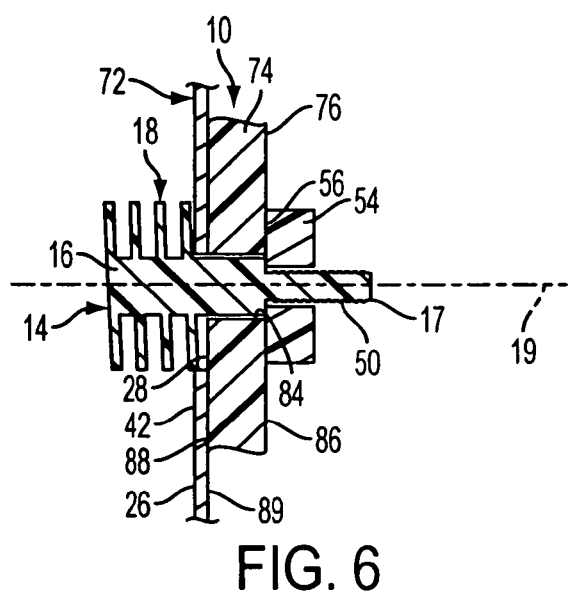
FIG. 6 is a view similar to FIGS. 4 and 5 showing the portion of the handle anchored against the roof rail.

FIGS. 4–6 illustrate anchoring the left end 74 of the passenger assist handle 70; the right end 75 being affixed similarly. In FIG. 4, the nut 54 is being threaded onto the second end portion 17 of the shaft 14 by a power tool 79 (FIG. 2) after the shaft 14 has been axially slid through an opening 84 in the base portion 76 in the direction of axis 19. The nut 54 continues to rotate on the shaft 14 until it bottoms against the shoulder 20 adjacent the smooth intermediate portion 15 of the shaft. As seen in FIG. 5, once the surface 56 of the nut 54 engages the shoulder 20, the entire shaft 14 begins to rotate clockwise, which is the same direction the nut 54 rotates in order to tighten against the shoulder 20. As previously explained, the leading edge 36 of the helix 18 (see FIG. 1) slides under the raised portion 38 of the opening 28 and the helix 18 begins to accumulate behind the rear surface 42 of the plate portion 26 of the top rail framing component 72. The rear surface 56 of the nut 54 then bears against the front surface 86 of the base portion 76, urging the passenger assist handle 70 toward the plate portion 26 of the top rail framing component 72. The nut 54 then becomes a stop as the rear face 88 of the base portion 76 abuts either the inside facing surface 89 of the rail 72, or whatever covering or passenger compartment lining is over the surface 89. The rotary tool 79 (FIG. 2) then torques out and begins to slip indicating that the anchoring arrangement 10 has anchored the left end 74 of the passenger assist handle 70 to the frame 72. The same procedure is performed with respect to the right end 75 of the passenger assist handle 70 to anchor the mounting stud 12 in a second teardrop shaped hole 28 through the top rail framing component 72.

By utilizing the anchoring arrangement 10, the passenger assist handle 70 withstands a pulling force of at least 300 pounds. While the passenger assist handle has a grip 71 which is shown as being molded unitary with the base portions 76 and 77, the grip in another embodiment is pivoted on the base portions.

As is seen in FIGS. 2 and 3 a pair of covers 90 and 92, which are preferably molded with the handle 70, are hinged with living hinges 93 and 94 to the base portions 76 and 78, respectively. The covers 90 and 92 are pivoted over the base portions 76 and 78 in order to obscure from view the nuts 54 and projecting second end portions 17 of the shafts 14.

Figure 7:
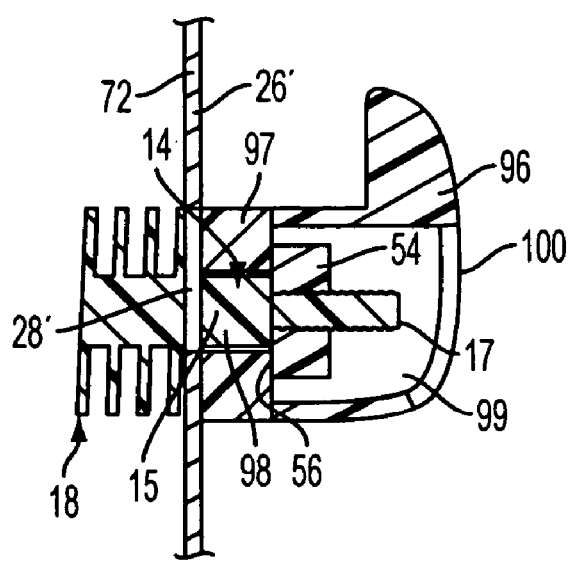
FIG. 7 is a side elevation showing a coat hook mounted on a framing component using the anchoring arrangement of FIG. 1.

Referring now to FIG. 7, there is shown a coat hook 96 mounted in a teardrop shape opening 28' on a retaining plate portion 26' of a top rail framing component 72 by the anchoring arrangement 10 of FIG. 1. The coat hook 96 has a base 97 with a hole 98 therethrough which receives the intermediate portion 15 of the shaft 14. The nut 54, which is driven by a power tool such as the power tool 79 shown in FIG. 2, is accessed though a recess 99 in the coat hook 96 that is subsequently closed by a snap cap portion 100.

While a passenger assist handle 70 is shown in FIGS. 2–6 and a coat hook 96 in FIG. 7, the anchoring arrangement 10 can be used to anchor other items in passenger compartments of automotive vehicles, such items including, but not limited to, rear view mirrors, visors, dashboards, dashboard components and lighting fixtures, wherein the items are equipped with a base that can be engaged with the rear surface 56 of the stop nut 54.

A preferred material from which to make the mounting stud 12 is DERIN®, an acetal homopolymer available from the DUPONT Company. Other polymers as well as metals may be used, but DERIN® is preferred.

Figure 8:
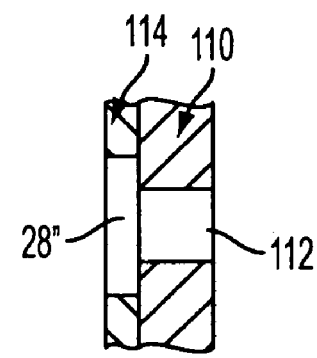
FIG. 8 is a side elevation showing two components that can be coupled using the anchoring arrangement of FIG. 1.

While the anchoring arrangement 10 shown in FIG. 1 has specific application for mounting items inside passenger compartments of automotive vehicles, the anchoring arrangement is used for anchoring items externally on automotive vehicles as well. Moreover, the anchoring arrangement 10 has heavy duty use for fastening any two components together. As is seen in FIG. 8, a first component 110 having an opening 112 therethrough may be fastened to a second component 114 having a teardrop shaped opening 28" similar to the opening 28 of FIG. 1.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. An arrangement anchoring a passenger assist handle having a grip portion to a roof rail of an automotive vehicle, the grip portion including a base portion on each end thereof, each base portion having a hole therethrough; the arrangement comprising:

a mounting stud extending through the hole in each base portion, each mounting stud having a shaft of a selected diameter, which shaft has first and second end portions, the first end portion of each shaft having a helix therearound, each helix having a diameter larger than the hole in each base portion;

the second end portion of each shaft having a stop element thereon of a diameter larger than the hole in each base portion, the second end portion of each shaft being constructed and arranged to cooperate with a rotating tool for advancing the helix, and a retaining plate portion of the roof rail, the retaining plate portion having holes therethrough with each hole having first and second diameters, the first diameter of each hole being sufficient to permit passage of the shaft of one of the mounting studs therethrough and the second diameter being sufficient to accommodate the diameter of the shaft plus the width of the helix of the mounting stud, wherein when each mounting stud is rotated, each helix is driven through one of the holes in the retaining plate portion unfit the base portion on each end of the grip portion of the passenger assist handle bottoms against the retaining plate portion of the roof rail to positively fix the passenger assist handle to the roof rail.

2. The arrangement of claim 1 wherein the second end portion of each shaft is threaded and each stop element is a nut threaded on the second end portion.

3. The arrangement of claim 2 wherein the second end of each shaft has a thread of opposite hand from the helix so that when each nut is rotated, the nut tightens against a first side of the base portion to tighten the base portion with respect to the passenger assist handle.

4. The arrangement of claim 3 wherein the helix on each stud is made of plastic.

5. The arrangement of claim 4 wherein the plastic is an acetal homopolymer.

6. The arrangement of claim 3 wherein each mounting stud is made entirely of an acetal homopolymer.

7. The arrangement of claim 1 wherein the handle is pivoted to each base.

8. The arrangement of claim 1 wherein the handle is unitary with each base.

9. An arrangement anchoring a passenger assist handle having a grip portion to a roof rail of an automotive vehicle, the grip portion including a base portion on each end thereof, each base portion having a hole therethrough; the arrangement comprising:

a mounting stud extending through the hole in each base portion, each mounting stud having a shaft of a selected diameter, which shaft has first and second end portions, the first end portion of each shaft having a helix therearound, each helix having a diameter larger than the holes in each base portion; the second end portion of each shaft being threaded and having a stop shoulder thereon;

a stop nut of a diameter larger than the hole in the base portion threaded to the second end portion of each shaft, each stop nut being constructed and arranged to cooperate with a rotating tool for advancing the helix after the stop nut abuts with the stop shoulder, a retaining plate portion of the roof rail, the retaining plate portion having a teardrop shaped holes therethrough, each hole having first and second diameters, the first diameters being sufficient to permit passage of the shaft of the mounting stud therethrough and the second diameters being sufficient to accommodate the diameter of the shaft plus the width of the helix, wherein when each mounting stud is rotated, each helix is driven through one of the holes in the retaining plate portion of the roof rail until the base of the passenger assist handle bottoms against the retaining plate portion to positively fix the passenger assist handle to the roof rail.

10. The arrangement of claim 9 wherein the second end of the shaft has a thread of opposite hand from the helix so that when the nut is rotated, the nut tightens against a first side of the base to tighten the base with respect to the framing component.

11. The arrangement of claim 10 wherein the at least the stud is made of plastic.

12. The arrangement of claim 11 wherein the plastic is an acetal homopolymer.

13. An arrangement anchoring an item to a framing component of an automotive vehicle, the item including at least one base portion, the base portion having a hole therethrough; the arrangement comprising:

a mounting stud extending through the hole in the base portion, the mounting stud having a shaft of a selected diameter, which shaft has first and second end portions, the first end portion of the shaft having a helix therearound, the helix having a diameter larger than the hole in the base portion; the second end portion of the shaft being threaded and having stop shoulder thereon;

a stop nut of a diameter larger than the bole in the base portion, the stop nut being threaded on the second end portion of the shaft and being constructed and arranged to cooperate with a rotating tool for advancing the helix after abutting with the stop shoulder, and a retaining plate portion of the framing component, the retaining plate portion having a teardrop shaped hole therethrough of first and second diameters, the first diameter being sufficient to permit passage of the shaft of the mounting stud therethrough and the second diameter being sufficient to accommodate the diameter of the shaft plus the width of the helix, wherein when the mounting stud is rotated the helix is driven through the hole in the retaining plate portion until the base of the item bottoms against the retaining plate portion to positively fix the item wit respect to the framing component.

14. The arrangement of claim 13 wherein the arrangement is in combination with the item, which item is a passenger assist handle having a hand grip portion including two ends, each end having a base portion, and wherein the retaining plate portion is a portion of a vehicle roof rail to which each base portion is anchored by an associated mounting stud.

15. The arrangement of claim 13 wherein the arrangement is in combination with the item, which item is a clothes hook, a visor, a mirror, a light fixture, a dashboard or a dashboard component.

16. The arrangement of claim 13 wherein the second end of the shaft has a thread of opposite hand from the helix so that when the nut is rotated, the nut tightens against a first side of the base to tighten the base with respect to the framing component.

17. The arrangement of claim 16 wherein the at least the stud is made of plastic.

18. The arrangement of claim 17 wherein the plastic is an acetal homopolymer.

* * * * *